(12) United States Patent
Xu et al.

(10) Patent No.: US 12,224,999 B2
(45) Date of Patent: Feb. 11, 2025

(54) METHOD FOR HIERARCHICAL INTERNET TRUST SHARING

(71) Applicant: Tsinghua University, Beijing (CN)

(72) Inventors: Ke Xu, Beijing (CN); Jianping Wu, Beijing (CN); Xiaoliang Wang, Beijing (CN); Qi Li, Beijing (CN); Ziqiang Wang, Beijing (CN); Songtao Fu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 535 days.

(21) Appl. No.: 17/544,935

(22) Filed: Dec. 8, 2021

(65) Prior Publication Data

US 2022/0182375 A1   Jun. 9, 2022

(30) Foreign Application Priority Data

Dec. 8, 2020   (CN) .......................... 202011443888.8

(51) Int. Cl.
   *H04L 9/40*   (2022.01)
   *H04L 9/00*   (2022.01)
   *H04L 9/32*   (2006.01)

(52) U.S. Cl.
   CPC ........ *H04L 63/0823* (2013.01); *H04L 9/3268* (2013.01); *H04L 63/0876* (2013.01);
   (Continued)

(58) Field of Classification Search
   CPC .. G06F 16/2471; G06F 16/27; G06F 21/6218; H04L 63/0823; H04L 63/0876;
   (Continued)

(56) References Cited

U.S. PATENT DOCUMENTS

| 10,924,466 B2* | 2/2021 | Biyani ..................... G06F 21/64 |
| 10,972,463 B2* | 4/2021 | Suthar ..................... H04L 63/20 |

(Continued)

FOREIGN PATENT DOCUMENTS

CN   109743172 A   *   5/2019

OTHER PUBLICATIONS

Angieri et al., "InBlock4: Blockchain-based Route Origin Validation," IEEE Infocom 2020—IEEE Conference on Computer Communications Workshops (Infocom Wkshps), pp. 291-296 (IEEE Aug. 10, 2020) (Year: 2020).*

*Primary Examiner* — Theodore C Parsons
(74) *Attorney, Agent, or Firm* — Hodgson Russ LLP

(57) ABSTRACT

A method for hierarchical Internet trust sharing includes dividing a network into intra-domain and inter-domain layers based on a management domain; performing authentication on a central certificate through a CA and publishing the central certificate to a blockchain; managing by the central node, a certificate of each communication node based on a real address; collecting by the central node, temporary data reported by each communication node every preset time interval, generating a trust evaluation value of each communication node based on the temporary data and forming a format file from the trust evaluation values; generating by the central node, a file digest from the format file at each preset time interval, and publishing the file digest verified by central nodes in the inter-domain to the blockchain; and automatically deleting by the blockchain, data from the time interval 1 to the time interval (N-T-1) to retain blockchain header information.

10 Claims, 4 Drawing Sheets

(52) U.S. Cl.
CPC ............ *H04L 63/101* (2013.01); *H04L 63/20* (2013.01); *H04L 9/50* (2022.05)

(58) Field of Classification Search
CPC ..... H04L 63/101; H04L 63/126; H04L 63/20; H04L 9/3239; H04L 9/3247; H04L 9/3268; H04L 9/50
See application file for complete search history.

(56) References Cited

U.S. PATENT DOCUMENTS 11,146,532 B2 * 10/2021 Tobin .................. H04L 63/1483
2018/0212970 A1 * 7/2018 Chen ...................... H04L 9/3236
2018/0302222 A1 * 10/2018 Agrawal ................. H04W 4/70

* cited by examiner

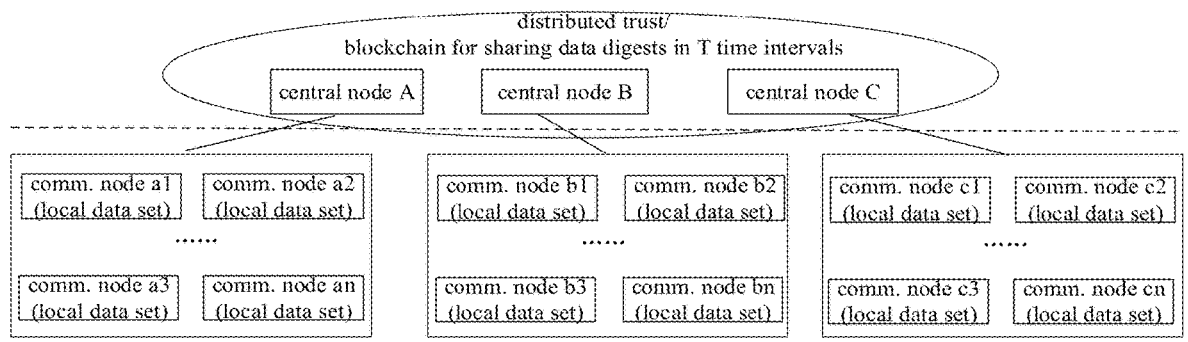

FIG. 1

- configuring a real address management module and an identity authentication module at a central node in a management domain, in which a real address is configured for identity authentication of a query service, and the identity authentication module is configured for a central certificate application and communication node certificate management — 201

- configuring a central data management module at the central node, and configuring a local data management module at a communication node in the management domain, to provide connections with the identity authentication module for data addition, deletion and update — 202

- collecting by the central node, temporary data of each communication node in the management domain, uniformly evaluating a node trust evaluation value and sending the node trust evaluation value to each communication node — 203

- generating by the central node, a format file from data within a time interval, verifying a file digest by central nodes in an inter-domain and publishing the file digest to a blockchain — 204

- directly obtaining by the communication node, intra-domain data from another communication node after verifying an identity of the communication node; or sending by the central node, node data in remaining domains to a communication node after verifying an identity of the communication node, in which original data of the node data and the corresponding data digest into the blockchain is maintained by the central node — 205

- automatically deleting by the blockchain, data from the time interval 1 to the time interval (N-T-1) to retain blockchain header information every T time intervals, where N is a number of blocks in the blockchain — 206

FIG. 2

METHOD FOR HIERARCHICAL INTERNET TRUST SHARING

CROSS-REFERENCE TO RELATED APPLICATION

This application claims priority to Chinese Patent Application No. 202011443888.8, filed on Dec. 8, 2020, the entire disclosure of which is incorporated herein by reference.

TECHNICAL FIELD

The disclosure relates to the field of trust data sharing between nodes in a computer network, and particularly to a method for hierarchical Internet trust sharing.

BACKGROUND

Generally, the Internet has a simple core and complex edges, which makes node behaviors in a transmission route unreliable, resulting in security problems such as route hijacking, traffic interception.

SUMMARY

According to a first aspect of the disclosure, a method for hierarchical Internet trust sharing includes: configuring a real address management module and an identity authentication module at a central node in a management domain, in which a real address is configured for identity authentication of a query service, and the identity authentication module is configured for a central certificate application and communication node certificate management; configuring a central data management module at the central node, and configuring a local data management module at a communication node in the management domain, to provide connections with the identity authentication module for data addition, deletion and update; collecting by the central node, temporary data of each communication node in the management domain, uniformly evaluating a node trust evaluation value and sending the node trust evaluation value to each communication node; generating by the central node, a format file from data within a time interval, verifying a file digest by central nodes in an inter-domain and publishing the file digest to a blockchain; directly obtaining by the communication node, intra-domain data from another communication node after verifying an identity of the communication node; or sending by the central node, node data in remaining domains to a communication node after verifying an identity of the communication node, in which original data of the node data and the corresponding data digest into the blockchain is maintained by the central node; and automatically deleting by the blockchain, data from the time interval 1 to the time interval (N-T-1) to retain blockchain header information every T time intervals, where N is a number of blocks in the blockchain.

The additional aspects and advantages of the disclosure will be set forth in the following specification, and will become obvious from the following description, or may be learned by practice of the disclosure.

BRIEF DESCRIPTION OF THE DRAWINGS

The above and/or additional aspects and advantages of the present disclosure may be obvious and easily understood in descriptions of embodiments in combination with figures.

FIG. 1 is an example diagram of a hierarchical trust sharing module according to an embodiment of the disclosure.

FIG. 2 is a flowchart of a method for hierarchical Internet trust sharing according to an embodiment of the disclosure.

DETAILED DESCRIPTION

Figure 3:
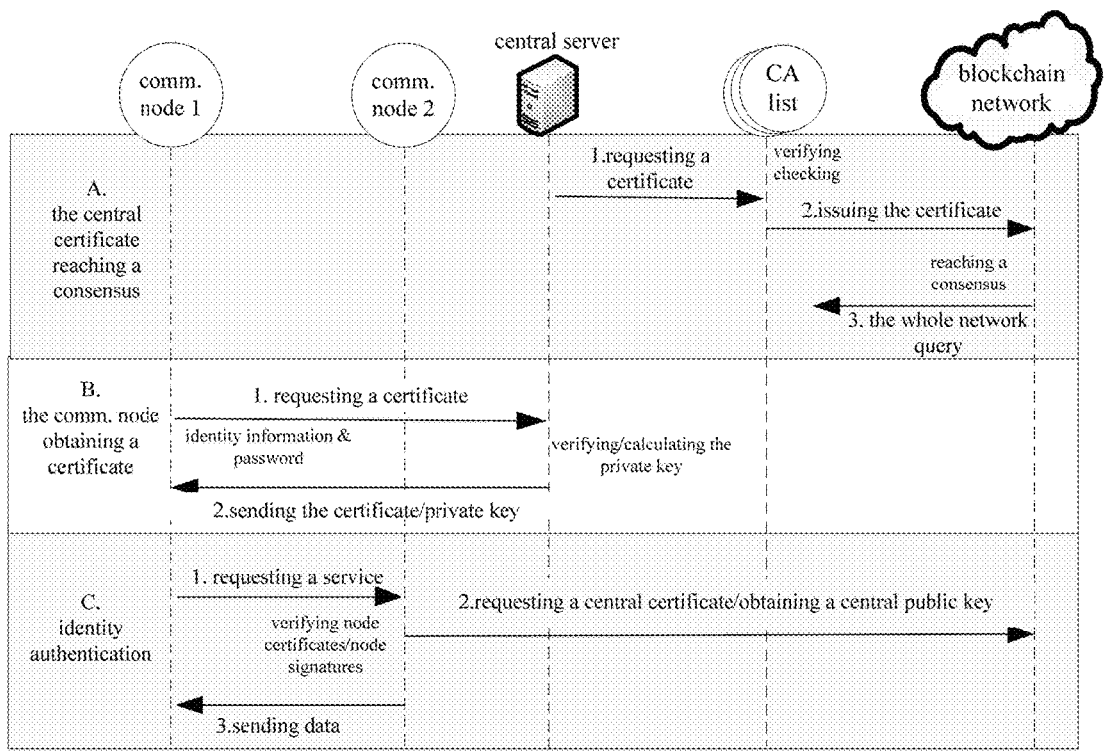
FIG. 3 is an example diagram illustrating central certificate management, communication node certificate management, and identity authentication according to an embodiment of the disclosure.

Embodiments of the disclosure are described in detail below, and examples of embodiments are illustrated in the accompanying drawings, in which the same or similar reference numbers represent the same or similar elements or elements with the same or similar functions. The embodiments described below with reference to the drawings are exemplary, are intended to explain the present disclosure and are not to be construed as a limitation of the disclosure.

In the related art, a trust management system framework is proposed for management of node trust degrees, where a storage scheme is designed for the trust degrees, and management models based on local trust information and based on global trust information are established. The management model based on the local trust information has strong expansibility, but its disclosure scope is limited, for example, it is difficult to apply to the Internet and other scenarios that need to realize end-to-end node trust sharing in a global scope. The management model based on the global trust information has a more accurate evaluation, but communication load of existing mechanisms is too large, resulting in the reduction of model availability. Meanwhile, both the management model based on the local trust information and the management model based on the global trust information realize identity authentication and guarantee information integrity based on signature mechanism, which brings great overheads. In addition, in the related art, an Internet hierarchical architecture is established and global authentication is realized through certificates in subsequent research, but a global sharing mechanism of trust evaluation value is not provided. Therefore in terms of node trust evaluation, there is still a lack of a scheme with flexible identity authentication, efficient data consensus strategy and low storage in a large scale.

Therefore, embodiments of the disclosure provide a method for hierarchical Internet trust sharing, which provides a more adaptive solution in identity authentication, data consensus and data query in order to improve sharing data such as a behavior deviation by adopting the network trust data sharing mechanism based on real identities. The method of the disclosure can solve a problem in the related art that the model for node trust management has low availability, effectiveness and reliability problems faced when trust data is shared among users in a large-scale network, and can be especially suitable for managing behavior deviation of Internet nodes. Specifically, a method for hierarchical Internet trust sharing according to an embodiment of the disclosure is described below with reference to the accompanying drawings.

FIG. 1 is a schematic diagram of a hierarchical trust sharing module according to an embodiment of the disclosure. It should be noted that in the embodiment of the disclosure, the Internet is divided into two layers (i.e., inter-domain and intra-domain) based on a management domain that for example includes multiple autonomous systems (ASs). The central nodes in the inter-domain form a distributed trust relationship. The central node is configured to manage the communication nodes in the intra-domain FIG. 2 is a flowchart of a method for hierarchical Internet trust sharing according to an embodiment of the disclosure. As shown in FIG. 2, the hierarchical Internet trust sharing method can include the following steps.

At 201, a real address management module and an identity authentication module are configured at a central node in a management domain, a real address management module is configured at a communication node in the management domain, in which the real address is configured for identity authentication of a query service and the identity authentication module is configured for a central certificate application and communication node certificate management.

In the embodiment of the disclosure, the identity authentication module performs authentication based on certificates through a gateway, a certification authority (CA), a blockchain and a communication node. A certificate of the central node reaches a consensus in the blockchain. In detail, a public key and private key are generated by the central node according to an identity ID of the central node. The public key, together with the identity ID, an IP address, and a signature, is submitted by the central node to the CA. A digital certificate with a CA signature is generated by the CA after the application from the central node is verified. Then, the CA sends the terminal address, the public key and the digital certificate to a main chain of the blockchain. The terminal address, the public key and the digital certificate are stored in a public key database through a consensus mechanism. The above process of the certificate into the blockchain can be shown in the process {A. the central certificate reaching a consensus} of FIG. 3.

In the embodiment of the disclosure, the communication node certificates in the intra-domain are managed by the management domain center, in which a certificate is issued, updated and deleted by a certificate management module in the management domain center. The certificate is verified by the communication node based on central signature information. The communication node initiates an application to a real management system through the allocated network access information (such as identity information and a password). The real address management module verifies the legitimacy and assigns a real address with an identity suffix to the node. The communication node obtains the real address and requests/applies for a certificate towards a central certificate management server. The above process that the communication node obtains a certificate can be as shown in the process {B. the communication node obtaining a certificate} of FIG. 3. In the embodiment of the disclosure, an authentication process between communication nodes is shown in the process {C. identity authentication} of FIG. 3. A source communication node (i.e., the comm. node 1) sends signature information through a private key. A destination communication node (i.e., the comm. node 2) obtains a central certificate from the blockchain to verify the certificate of the source communication node and obtains a central public key from the blockchain to verify the signature of the source communication node and confirm the identity. The authentication process for a data update request sent by the central node to the communication node is also consistent. The central node attaches a central signature through the private key. The communication node is enabled to perform authentication on the central signature received in a data packet based on the central public key queried in the blockchain. After the authentication is passed, the communication node responds to the access request and realizes identity authentication of the central node.

In some embodiments, the real address is generated by the real address management module at the central node in the intra-domain. Each communication node has the ability to filter the illegal source address traffic for communication based on the real address. The last 64 bits of the real address are node dynamic identifiers. The forged address information is filtered based on the real address by binding the end node with the switch port. At the router, the forged address prefix is filtered based on the IP prefix. As the first layer in two-level identity authentication, this scheme is used for services such as data query.

At 202, a central data management module is configured at the central node, and a local data management module is configured at the communication node, to provide connections with the identity authentication module for data addition, deletion and update.

In the embodiment of the disclosure, the central data management module is configured at each central node, the local data management module is configured at each communication node in the same AS with the central node, thereby forming a hierarchical structure as shown in FIG. 1. A consensus on the issued data between the central nodes is reached in the blockchain, and each central node centrally manages data from communication nodes in the domain. The certificate-based authentication is provided for the data update, addition and deletion services. For the query service, the malicious traffic is filtered by binding in access control lists (ACL) rules based on the real address issued by the center.

At 203, the central node collects temporary data of the communication nodes in the management domain, uniformly evaluates and sends node trust evaluation values to the communication nodes.

In the embodiment of the disclosure, the central node collects the temporary data reported by each communication node every preset time interval, generates an evaluation value on each node according to the temporary data, and forms a format file from the data at each node in the current intra-domain, so as to realize data establishment in the intra-domain.

At 204, the central node forms a format file from data at the current time interval, and a file digest is verified by nodes in the inter-domain and published to a blockchain.

In some embodiments, the central node generates a data digest of trust files in the intra-domain at each time interval. An alliance chain between the central nodes is established to check the data digest. The passed data digest is then published to the blockchain. Thus, the data update is realized in the inter-domain.

At 205, the communication node directly obtains data from the intra-domain: after verifying an identity of the communication node, the communication node obtains data from another communication node. The communication node obtains node data from the remaining domains: after verifying an identity of the communication node, the central node sends the node data from the remaining domains to the communication node, in which the central node maintains the original data for the node data from the remaining domains and the corresponding data digest into the blockchain.

Figure 4:
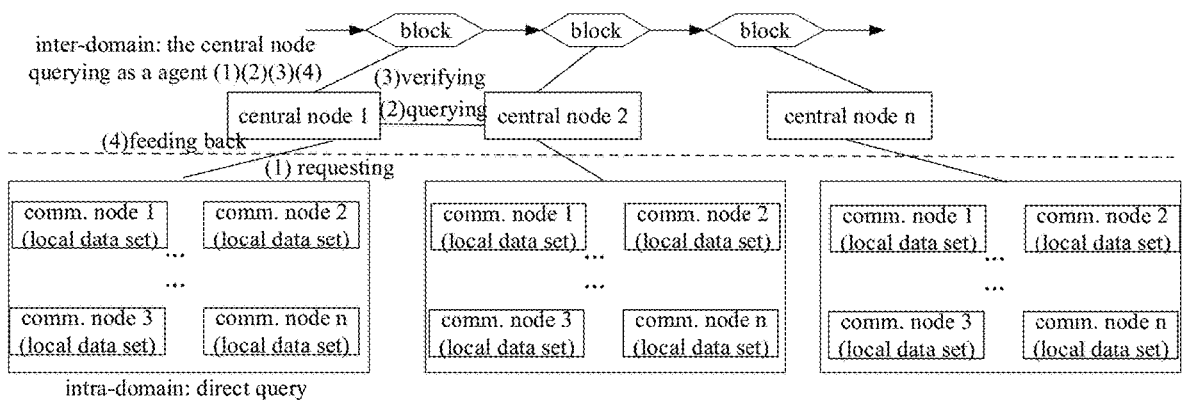
FIG. 4 is an example diagram of a centralized query in an inter-domain and a distributed query in an intra-domain according to an embodiment of the disclosure.

In the embodiment of the disclosure, as shown in FIG. 4, the communication node can directly obtain data from other communication nodes in the intra-domain and obtain verification from the central node. Since the access network and IP prefix for the transmission data is filtered based on the real address, the security of the data acquisition process can be ensured.

As an example of a possible implementation, the process of data acquisition in the inter-domain is described as follows, in which the intra-domain data is filtered based on the real address, and the inter-domain data is authenticated through the certificate.

1) The communication node sends a request to the center, in which the request includes a node and a domain where the node is located.

2) The central node checks whether there is locally data for the domain. If yes, directly proceeding to the step 4); if no, the central node sends a request to another central node corresponding to the domain for obtaining node trust data in the domain.

3) The central node queries whether there is a digest file corresponding to the domain at the current stage locally. If yes, the central node may directly verify the digest file. If no, the central node may read the digest file from the blockchain for verification.

4) The central node transmits the queried node trust data to its own local nodes. At 206, every T time intervals, the blockchain automatically deletes data from the time interval 1 to the time interval (N-T-1) to retain blockchain header information, where N is a number of blocks in the blockchain.

Figure 5:
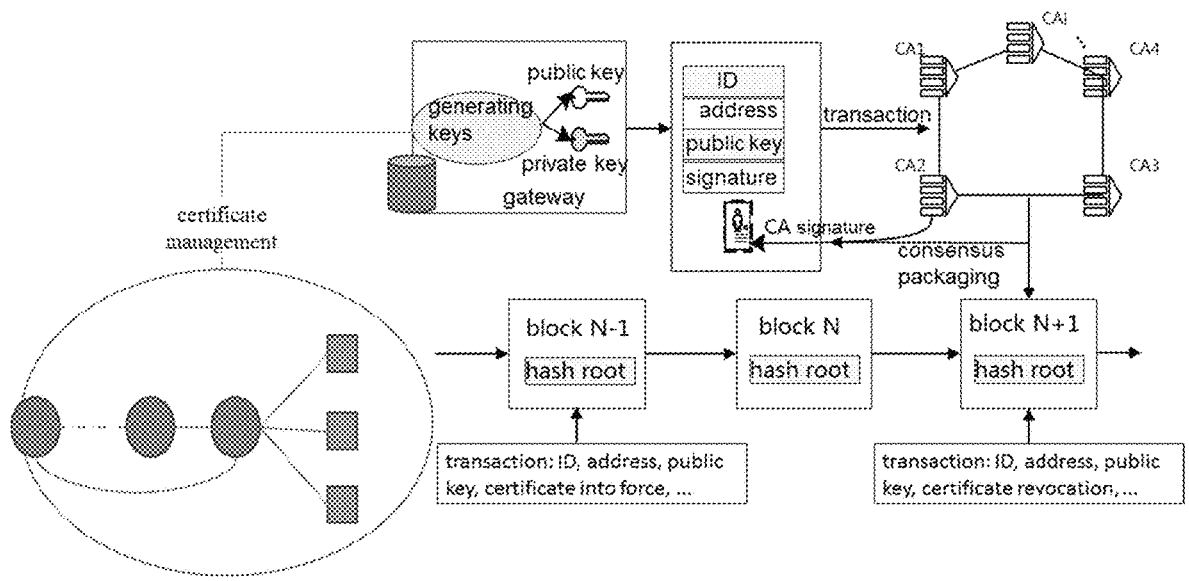
FIG. 5 is an example diagram of a certificate management module according to an embodiment of the disclosure.
Figure 6:
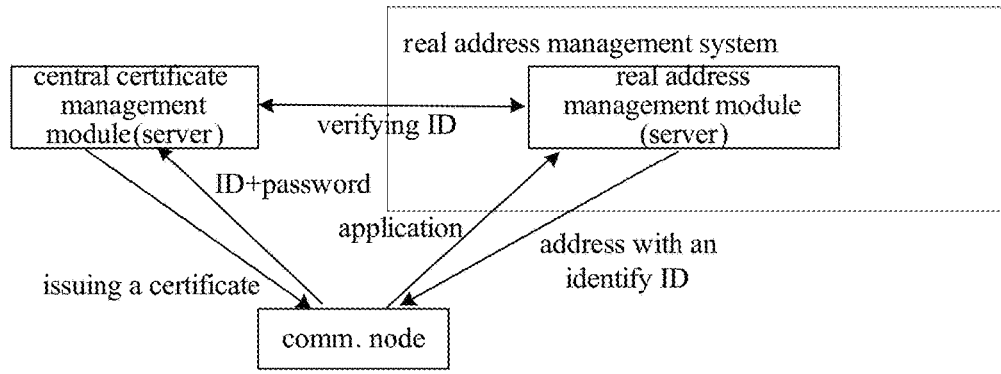
FIG. 6 is an example diagram of the central certificate/node certificate management and authentication process according to an embodiment of the disclosure.
Figure 7:
FIG. 7 is a schematic diagram illustrating a blockchain retaining a part of full nodes according to an embodiment of the disclosure.

Optionally, at the end of each time period, the blockchain automatically deletes the data from the time interval 1 to the time interval (N-T-1) every T time intervals as shown in FIG. 7, and only retains the blockchain header information to realize digest management in the blockchain. In conclusion, the embodiment of the disclosure completes sharing trust data based on the real identity in the intra-domain by the identity authentication module and the data management module. The identity authentication module includes the real address management and certificate management module. As shown in FIG. 5, a terminal with the real address generates a public-private key according to the identity ID, and submits the identity certificate, IP address, public key and signature to the CA. After the application is verified, the CA generates a digital certificate with a CA signature. The information such as the terminal address, public key, and certificate are sent to the blockchain, which forms in the public key database through the consensus mechanism. The certificate of the communication node in the intra-domain is issued and managed by the management domain center. The communication node can download the certificate of the central node from the blockchain to verify the identity of the center. As shown in FIG. 6, the communication node obtains its own identity and password by offline distribution and applies for the real address. The central node assigns an IP address associated with the real identity to the communication node, in which a dynamic ID is embedded into the IP address suffix so as to identify the node identity. The center sends a real address filtering scheme to each communication node, thereby filtering malicious traffic in the intra-domain. The consensus between the central nodes is reached on the certificate. The communication node obtains the certificate and performs identity authentication in a way of FIG. 3.

Figure 8:
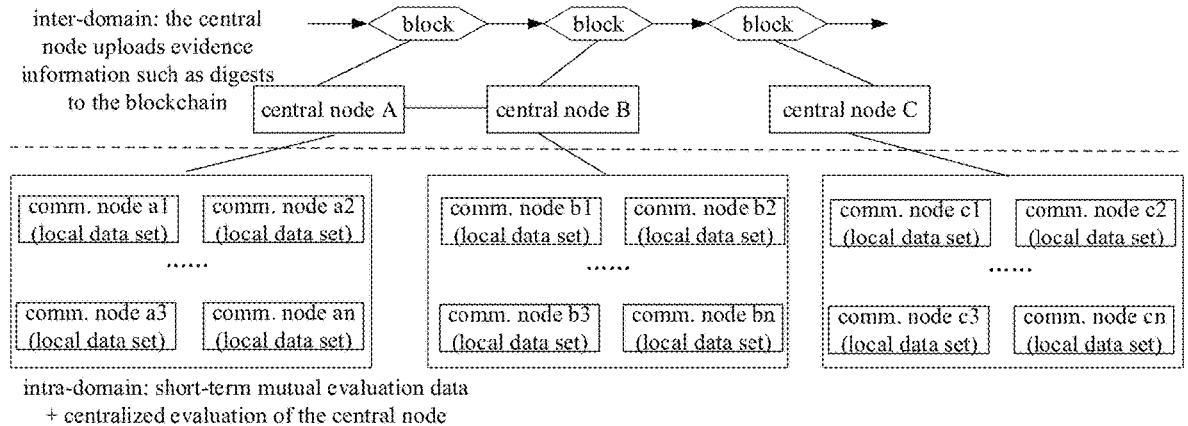
FIG. 8 is an example diagram illustrating hierarchical storage management according to an embodiment of the disclosure.

In the embodiment of the disclosure, the communication node generates data, the center processes and enters the data into the blockchain. The query process in the intra-domain and inter-domain is shown in FIG. 4. As shown in FIG. 8, through the hierarchical storage management, the center performs centralized management within a certain range of the intra-domain, and the inter-domain central node uploads digest information to the blockchain for verification. The nodes of the intra-domain submit trust data within a certain time range. At the end of each time period, the center may conduct centralized evaluation and calculation to obtain a trust evaluation value of each node. The global data in the inter-domain can be verified by issuing a trust evaluation file and recording a file digest into the blockchain. In the embodiment, the blockchain is truncated to only retain file digest data in T time intervals and blockchain header for all the other data, thereby reducing storage space requirements.

In order to facilitate those skilled in the art to more clearly understand the disclosure, the above hierarchical Internet trust sharing method will be described in the following embodiment where behavior deviation in a management domain is shared.

In this embodiment, as shown in FIG. 1, central nodes in three management domains are marked as A, B and C respectively, communication nodes in three management domains are marked as (a1, a2, a3 . . . an), (b1, b2, b3 . . . bn) and (c1, c2, c3 . . . cn) respectively. The IP prefix for each management domain is set as 2001:: 0000, 2002:: 0000, and 2003:: 0000. The IP prefix is a 64 bit allocation value.

In this embodiment, an update time interval is set to 300 seconds. In each time interval, the local database stores temporary data, which includes a timestamp of the current time interval, address suffix and corresponding behavior evaluation value. The behavior evaluation value is quantified as 0~100, where 0 is a lower limit of the evaluation value indicating that the node behavior is completely untrusted, and 100 is an upper limit of the evaluation value indicating that the node behavior is completely trusted. The blockchain retains full nodes for time intervals of T=5.

In this embodiment, the central certificate is placed in the blockchain for all nodes to query, and the communication node certificate is issued by the central node and verified by the communication node through the central signature.

In this embodiment, after the communication node enters the management domain and obtains its address and certificate, a behavior evaluation value of a corresponding node is obtained by the communication process as temporary data which is synchronized with the central node every 300 seconds.

Figure 9:
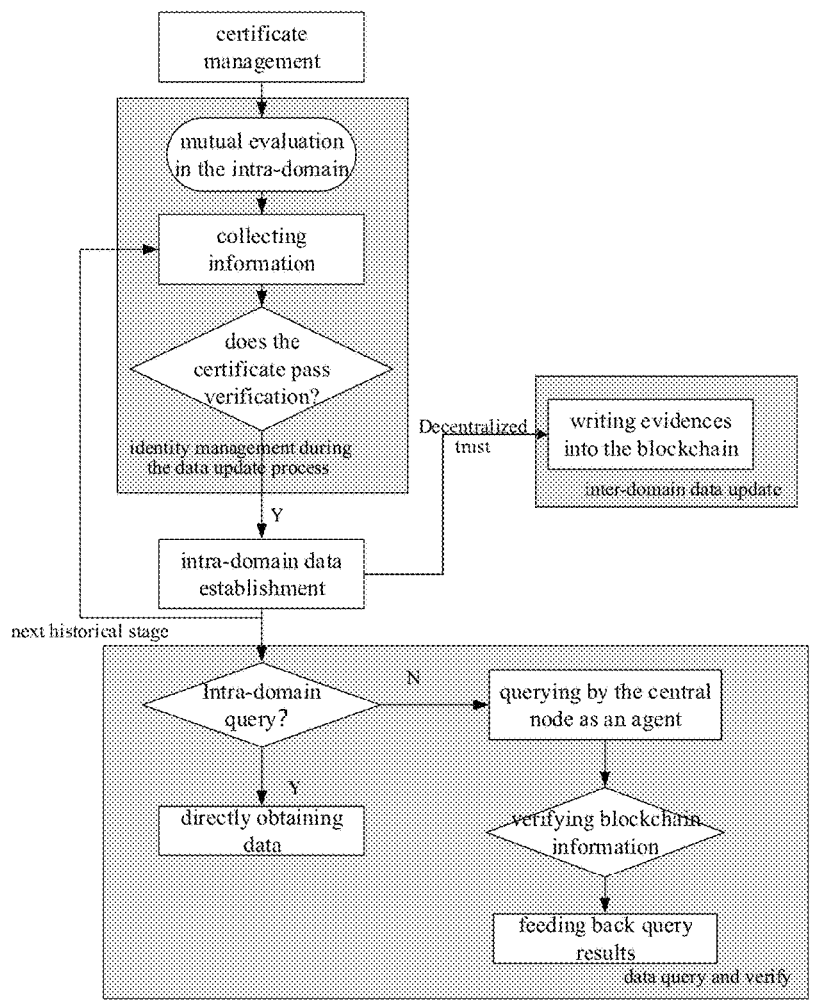
FIG. 9 is an example diagram of evaluation management and query process according to an embodiment of the disclosure.

As shown in FIG. 9, the evaluation management and query process adopted in the hierarchical Internet trust sharing method according to the embodiment of the disclosure can be as follows:

i) certificate management: an alliance chain is formed of central servers, each of the central servers generates its own public key and private key and sends them to a list of CAs for checking; when 5 CAs (or more than 5 CAs, the number can be flexibly selected in practice) pass the checking, a certificate with 5 CA signatures is sent to each central server, which includes information such as an effective date; each central server verifies the signature; after a consensus is reached, the certificate information is added to the blockchain so as to generate a certificate record that can be queried by the whole network.

The center can take a node address as a public key according to node information to generate a corresponding private key, and transmit the private key and certificate to the node. The node is signed with the private key, and the other nodes verify a signature of the center in the communication node certificate, confirm that the communication node certificate is issued by the center. That is, the identity of the communication node is verified according to the public key in the certificate during the communication process.

ii) identity management in the data update process: when data among the central node A and nodes (a1, a2, a3 . . . an) is updated, the identity authentication module performs authentication based on certificates. The traffic filtering strategy based on a real address is uniformly configured in an access network switch and router by the central real address management server. The router in the central node A is configured to pass the traffic with a prefix 2001:: 0000 and filter out the remaining traffic. For example, the node a1 is assigned with the address 2001:: 0001, which is bound with the corresponding interface switch filter out other addresses except this address.

iii) data establishment in the intra-domain: the communication nodes (a1, a2 and a3) obtain their respective 64 bit address suffixes, (2001:: 0001, 2001:: 0002, 2001:: 0003 and 2001:: 0004). In each time interval (300 s), mutual behavior evaluation values between the nodes are saved. For example, the mutual evaluation value for a1 communicating with a2 is 90, the evaluation value for a2 communicating to a3 is 70, and the evaluation value for a3 communicating to a2 is 80. At the end of each time period, each node sends all temporary data to the central node A. The central node A obtains trust data of each node in this time period after calculation.

DATA: (a1: s1, a1: s2, a3: s3, . . . , an:sn), where sn is a trust value of the corresponding node.

iv) data update in the inter-domain. The time interval is numbered with TS by the domain A. the digest of DATA is calculated as follows:

DigestA: SHA256 (TS||DATA)

where || indicates an addition of strings, the node A issues the DigestA, the nodes B and C review the DigestA. For example, it is specified that the 5 central nodes all pass the reviewed DigestA, the published content is attached with signatures of the central nodes for reviewing, SignN(DigestA). The published content is expressed by Info: (DigestA||Sign1||Sign2||Sign3||Sign4||Sign5)

This message is published to the blockchain for global query.

v) data query and verification, including data acquisition and verification for intra-domain nodes and inter-domain nodes.

This step includes obtaining data by an intra-domain node and obtaining data by an inter-domain node. The details are as follows:

1. Data Acquisition by the Intra-Domain Node

All communication nodes can obtain files stored in a standard format at the node through real address filtering. According to verification information of the node synchronized with the center at the last time interval, it is verified whether the data obtained from the communication node is correct.

2. Data Acquisition by the Inter-Domain Node (1) The communication node sends a request to the center, in which the request includes a node and a domain where the node is located. For example, when nodes b2 and b3 in the domain B and the node c2 in the domain C are requested, the request format is as follows:

Requirement: (B||b2||b3, C||c2)

(2) The central node checks whether there is locally data for the domain. If there is only data for the domain B, the central node reads and stores the data; and the central node obtains the data for the domain C at the current time interval, and the domain C feeds back the current data (DATA) and signature information.

(3) The central node queries whether there is a digest file (DigestA) corresponding to the domain C at the current stage locally. If yes, the central node may directly verify the DigestA. If no, the central node may read the Info from the blockchain for verification, verify and check the node signature for local storage, and verify the obtained trust file of the domain C.

(4) The central node transmits the queried node trust data to its own local nodes.

Answer: (B||b2: s1||b3: s3, C||c2: s3)

vi) At the end of each time interval, a new block is added to the blockchain, and the remaining blocks keep their block headers under a premise that 5 complete blocks are retained currently. The query node can query and verify a block header from a foundation block to a block of the latest time interval. At the same time, each central node can maintain its own digest data and Merkel tree verification path, and if necessary, each central node can be verified combining with a tree root of the historical blockchain head, so as to prove the authenticity of the data provided in the historical stage.

Therefore, it can be seen that the disclosure fully considers the feature that a large-scale network has a management domain including one or more autonomous systems as a management unit, introduces a framework of identity management and data management, and realizes effective and reliable management on trust data sharing in the intra-domain through hierarchical identity management.

To sum up, compared with the related art, the above sharing method in the embodiment of the disclosure has at least the following advantages: the hierarchical identity verification/authentication of the disclosure takes into account efficiency and reliability, the certificate management is realized by an alliance chain, and traffic filtering is realized by embedding the IP address of the real identity; the hierarchical storage of the disclosure takes into account intra-domain and inter-domain trust management, in which the distributed trust on data within a certain range is established in the inter-domain, a centralized trust management mechanism is established in the intra-domain in a centralized manner. The disclosure adopts a combination of centralized management and distributed query, thereby improving the query efficiency while ensuring the accuracy of trust data.

With the above method in the embodiment of the disclosure, a hierarchical identity authentication mechanism is established, intra-domain communication is established based on the real address for querying communication, identity authentication is further realized through certificates for updating communication, in which a certificate management of the central node in a domain is realized domain through a blockchain, and communication node certificates in the domain are managed by the central node, thereby forming a hierarchical certificate management platform. At the same time, the hierarchical architecture is also adopted in the trust storage and sharing. In view of the trust storage, the hierarchical storage takes into account the intra-domain and inter-domain trust management, in which the distributed trust on data within a certain range is established in the inter-domain, and a centralized trust management mechanism is established in the intra-domain in a centralized manner; In view of trust query, a centralized query performed by the central node as an agent in the inter-domain is combined with a distributed query performed by nodes in the intra-domain, so as to improve query efficiency while ensuring the accuracy of trust data.

In the disclosure, descriptions with reference to terms "an embodiment", "some embodiments", "example", "specific example" or "some examples" mean specific features, structures, materials or characteristics described in combination with the embodiment or example are included in at least an embodiment or example of the disclosure. The schematic representations of the above terms do not have to be the same embodiment or example. Moreover, specific features, structures, materials or characteristics described may be combined in one or more embodiments or examples in a suitable manner. Furthermore, embodiments or examples described in the specification, as well as features of embodiments or examples, may be combined without conflicting with each other.

Any process or method described in the flowchart or otherwise described herein may be understood as representing one or more modules, segments, or portions of codes of executable instructions for implementing the blocks of a customized logical function or process, and the scope of the embodiments of the present disclosure includes additional implementations, in which the functions may be executed not in the sequence shown or discussed, including in a substantially simultaneous manner or in a reverse sequence, which will be appreciated by those skilled in the art the embodiments of the disclosure belong to.

The logics and/or blocks represented in the flowchart or described in other ways herein, for example, may be considered as an ordered list of executable instructions configured to implement logic functions, which may be specifically implemented in any computer readable medium for use by a system, an apparatus or a device for executing instructions (such as a computer-based system, a system including a processor, or other systems that may obtain and execute instructions from a system, an apparatus or a device for executing instructions) or in combination with the system, the apparatus or the device for executing instructions. A "computer readable medium" in the disclosure may be an apparatus that may contain, store, communicate, propagate or transmit a program for use by a system, an apparatus or a device for executing instructions or in combination with the system, the apparatus or the device for executing instructions. A more specific example (a non-exhaustive list) of a computer readable medium includes the followings: an electronic connector (an electronic apparatus) with one or more cables, a portable computer disk box (a magnetic device), a random access memory (RAM), a read-only memory (ROM), an electrically programmable read-only memory (an EPROM or a flash memory), an optical fiber apparatus, and a portable optical disk read-only memory (CDROM). In addition, a computer readable medium even may be paper or other suitable medium on which a program may be printed, since paper or other medium may be optically scanned, and then edited, interpreted or processed in other suitable ways if necessary to obtain a program electronically and store it in a computer memory.

It should be understood that all parts of the disclosure may be implemented with hardware, software, firmware and their combination. In the above embodiment, a plurality of blocks or methods may be stored in a memory and implemented by software or firmware executed by a suitable system for executing instructions. For example, if implemented with a hardware, they may be implemented by any of the following technologies or their combinations known in the art as in another implementation: discrete logic circuits with logic gate circuits configured to achieve logic functions on data signals, a special integrated circuit with appropriate combined logic gate circuits, a programmable gate array (PGA), a field programmable gate array (FPGA), etc.

Those skilled in the art may understand that all or part of blocks in the above method embodiments may be implemented by instructing relevant hardware by computer programs. The programs may be stored in a computer readable storage medium, and the programs may include one of blocks of the method embodiments or their combination when executed.

In addition, functional units in the embodiments of the disclosure may be integrated in one processing module, or each of the units may be physically existed alone, or two or more units may be integrated in one module. The integrated module may be achieved by a form of hardware, and also may be achieved by a form of a software functional module. The integrated module may be stored in a computer readable storage medium when it is implemented in a form of a software functional module and sold or used as an independent product.

The above storage medium may be a read-only memory, a magnetic disk or an optical disk. Even though embodiments of the disclosure have been illustrated and described above, it may be understood by those skilled in the art that various changes, modifications, substitutions and alterations may be made for the embodiments without departing from the principles and spirit of the disclosure, and the scope of the disclosure is defined by claims and their equivalents.

What is claimed is:

1. A method for hierarchical Internet trust sharing, wherein the Internet is divided into an inter-domain layer and an intra-domain layer based on management domains, each of the management domains comprises a central node and a plurality of communication nodes, the method comprising:
    configuring an identity authentication module at the central node, in which the identity authentication module comprises a real address management module, a real address is configured for identity authentication of a query service, and the identity authentication module is configured to apply for a first certificate of the central node and manage a second certificate of each communication node;
    configuring a central data management module at the central node, and configuring a local data management module at each communication node, to provide connections with the identity authentication module for data addition, deletion and update;
    collecting by the central node, temporary data reported by each communication node every preset time interval, generating a trust evaluation value of each communication node based on the temporary data, and sending the trust evaluation value to each communication node;

generating by the central node, a format file from data at each communication node every preset time interval, so that a file digest of the format file is verified by other central nodes in the inter-domain layer, and the file digest is published to a blockchain;

directly obtaining by a target communication node in a target management domain among the plurality of management domains, intra-domain data from another communication node in the target management domain after verifying an identity of the target communication node; or sending by a target central node in the target management domain, trust data of another communication node in another management domain to the target communication node after verifying an identity of the target communication node, in which original data of the trust data and corresponding data digest in the blockchain is maintained by the target central node; and automatically deleting by the blockchain, file digest data from the time interval 1 to the time interval (N-T-1) to retain blockchain header information every T time intervals, where N is a number of blocks in the blockchain, where the N-T-1 is greater than 1.

2. The method of claim 1, wherein the identity authentication module is configured to perform authentication on the first certificate by acts of:

generating by the central node, a public key and a private key based on an identity ID of the central node, submitting by the central node, the identity ID, an IP address, the public key and a signature to the CA;

generating by a certification authority (CA), a digital certificate with a CA signature after a request from the central node is verified, and sending by the CA, the IP address, the public key and the digital certificate to a main chain of the blockchain to store the IP address, the public key and the digital certificate in a public key database through a consensus mechanism.

3. The method of claim 2, wherein the identity authentication module is configured to issue the second certificate by acts of:

initiating by the communication node, a request for the second certificate including network access information to the real address management module, verifying by the real address management module, legitimacy of the request and assigning a real address with an identity suffix to the communication node, and in response to the request of the communication node that receives the real address, issuing the second certificate to the communication node.

4. The method of claim 3, further comprising:

sending by a source communication node among the plurality of communication nodes, signature information through the private key, and obtaining by a destination communication node among the plurality of communication nodes, a central certificate from the blockchain to verify a certificate of the source communication node, and obtaining a central public key from the blockchain to verify the signature information of the source communication node.

5. The method of claim 3, further comprising:

sending by the central node, a data update request in a data packet to the communication node, in which the data packet includes a signature of the central node through the private key, performing authentication on the signature of the central node by the communication node based on a central public key queried in the blockchain, and responding to the data update request after passing identity authentication of the central node.

6. The method of claim 1, wherein the real address management module in the management domain is configured to generate the real address, so that each communication node has the ability to filter illegal source address traffic for communication based on the real address, in which last 64 bits of the real address are node dynamic identifiers, forged address information is filtered based on the real address by binding an end node with a switch port, and a forged address prefix is filtered based on an IP prefix at a router.

7. The method of claim 1, wherein the central data management module is configured to manage data from communication nodes in the management domain and send data to the blockchain for reaching a consensus; and wherein certificate-based authentication is provided for data update, addition and deletion services; real address-based authentication is provided for the query service, in which malicious traffic is filtered by binding in access control lists (ACL) rules based on the real address issued by the central node.

8. The method of claim 1, wherein generating the format file comprises:

generating by the central node, a data digest of trust files in the intra-domain within each preset time interval, checking the data digest by an alliance chain formed of inter-domain central nodes, and publishing the checked data digest to the blockchain.

9. The method of claim 1, wherein directly obtaining the intra-domain data from another communication node in the target management domain comprises:

in response to a query request that the target communication node (a1) in the target management domain (A) obtains data of the another communication node (a2) in the target management domain (A), verifying an identity of the target communication node (a1) based on the real address and directly sending data of the another communication node (a2) to the target communication node (a1).

10. The method of claim 1, wherein sending the inter-domain data of the another communication node in the another management domain comprises:

initiating by the target communication node (a1) of the target management domain (A), a query request to the target central node in the target management domain (A), in which the query request includes the another communication node (b1) and the another management domain (B) where the another communication node (b1) is located;

in response to the target central node determining that there is locally data for the another management domain (B), sending the trust data of the another communication node (b1) to each communication node in the target management domain (A);

in response to the target central node determining that there is no locally data for the another management domain (B), sending a request for obtaining the trust data of the another communication node (b1) to a central node of the another management domain (B);

in response to the target central node determining that there is a digest file of the another management domain (B) locally, directly verifying the digest file; and in response to the target central node determining that there is no digest file of the another management domain (B) locally, reading the digest file of the another management domain (B) from the blockchain for verification.

* * * * *